US008733487B2

(12) United States Patent
Usami et al.

(10) Patent No.: US 8,733,487 B2
(45) Date of Patent: May 27, 2014

(54) BATTERY MOUNTING STRUCTURE OF ELECTROMOTIVE VEHICLE

(75) Inventors: Ikuo Usami, Hiroshima (JP); Hirokazu Kita, Hiroshima (JP); Hiroyuki Nomura, Hiroshima (JP); Noriaki Mitobe, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 170 days.

(21) Appl. No.: 13/276,932

(22) Filed: Oct. 19, 2011

(65) Prior Publication Data

US 2012/0097466 A1 Apr. 26, 2012

(30) Foreign Application Priority Data

Oct. 26, 2010 (JP) ................................ 2010-239609

(51) Int. Cl.
*B60R 16/04* (2006.01)
*B60K 1/04* (2006.01)

(52) U.S. Cl.
CPC ........... *B60K 1/04* (2013.01); *B60K 2001/0438* (2013.01)
USPC ......................................................... 180/68.5

(58) Field of Classification Search
CPC .. B60R 16/04; B60K 2001/0438; B60K 1/04; H01M 2/1077; H01M 2/1083; H01M 10/5057; B62D 21/11
USPC ........................................... 180/68.5; 429/83
See application file for complete search history.

(56) References Cited

U.S. PATENT DOCUMENTS

| | | | | |
|---|---|---|---|---|
| 5,555,950 | A * | 9/1996 | Harada et al. | 180/65.1 |
| 7,396,075 | B2 * | 7/2008 | Ohkuma et al. | 297/180.1 |
| 8,372,530 | B2 * | 2/2013 | Kubota et al. | 429/100 |
| 2005/0274556 | A1 * | 12/2005 | Chaney | 180/68.5 |
| 2006/0289224 | A1 * | 12/2006 | Ono et al. | 180/311 |
| 2008/0173489 | A1 * | 7/2008 | Takasaki | 180/68.5 |
| 2008/0190679 | A1 * | 8/2008 | Sato et al. | 180/68.5 |
| 2009/0197154 | A1 * | 8/2009 | Takasaki et al. | 429/83 |
| 2010/0071979 | A1 * | 3/2010 | Heichal et al. | 180/68.5 |

FOREIGN PATENT DOCUMENTS

| | | |
|---|---|---|
| JP | 2006-224877 A | 8/2006 |
| JP | 2009-083597 A | 4/2009 |

* cited by examiner

*Primary Examiner* — J. Allen Shriver, II
*Assistant Examiner* — Brian Cassidy
(74) *Attorney, Agent, or Firm* — Studebaker & Brackett PC

(57) ABSTRACT

A battery unit comprises plural side connection portions which are provided at its both-side end portions in a vehicle width direction and connected to said vehicle-body member, and these connection portions are connected to a high rigidity portion of a vehicle-body member, concretely, to the vehicle-body member at a specified position where floor cross members integrally connected to a vehicle floor panel are located, to the vehicle-body member at a specified position where a torque box is located, or to the vehicle-body member at a specified position where a kick-up portion of the vehicle floor panel is located. Accordingly, the torsional rigidity of the vehicle body can be increased by utilizing the battery unit mounted below the vehicle body floor (vehicle floor panel).

8 Claims, 6 Drawing Sheets

1
1a
1b
3
3a
7
8
9
10
21
21a
21b
23c(23)
24a
(24)
24b
(24)
38
41
41a
41b
41c
48
48a
(48)
49
50
61
63
68
72
Fr

Fr
1
1a
1b
3
7
8
9
10
12
13
14
15
16
16b
17
21
21a
21b
24a(24)
24b(24)
41a
41b
41c
48
48a(48)
49
50
72
81
85
86
87
IV
VII 21
21a
21b
23c(23)
25
72
72
72
68
61
49
49
41b
48a
48b
48
48
48
48
48
48
48
48
23b
(23)
23a
(23)
41
Fr
41c
41c
50
50
37
37
31
41a 22
60
72
61
72
35
22
68
70
72
49
62
41b
22
48
67
41
67a
48
49
48
28
27
42
46
42
48
48
40
Fr
22
42
41c
48
46
42
43
41c
22
33
48
50
41a
44
31
50

BATTERY MOUNTING STRUCTURE OF ELECTROMOTIVE VEHICLE

BACKGROUND OF THE INVENTION

The present invention relates to a battery mounting structure of an electromotive vehicle in which a battery unit is mounted below a vehicle floor.

In general, plural battery modules are mounted as a unit below a vehicle floor in an electromotive vehicle, such as an electric automotive vehicle. A battery unit like this is generally connected to a vehicle-body member. Japanese Patent Laid-Open Publication No. 2006-224877, for example, discloses a structure in which the frames of the unit including fuel batteries are provided along the lower walls of the extension side members extending at the vehicle-body rear side portions of the front side members, and these frames are connected to the extension side members at plural positions in the longitudinal direction by fastening bolts.

Herein, in the structure of the above-described patent publication, the connection portions of the battery unit and the extension side member of the battery unit are positioned merely at appropriate intervals in the vehicle longitudinal direction. Accordingly, the battery unit may not contribute to any improvement of the torsional rigidity of the vehicle body, so that the connection of the heavy battery unit may improperly cause decrease of the torsional rigidity of the vehicle body.

SUMMARY OF THE INVENTION

The present invention has been devised in view of the above-described matter, and an object of the present invention is to provide a battery mounting structure of an electromotive vehicle which can improve the torsional rigidity of the vehicle body by utilizing the battery unit mounted below the vehicle floor.

According to the present invention, there is provided a battery mounting structure of an electromotive vehicle, comprising a vehicle-body member constituting a vehicle body, and a battery unit mounted below a vehicle floor, the battery unit comprising a battery module, a support member to support the battery module, and plural side connection portions provided at both-side end portions thereof in a vehicle width direction and connected to the vehicle-body member, wherein the side connection portions of the battery unit are connected to a high rigidity portion of the vehicle-body member.

According to the present invention, since the side connection portions of the battery unit are connected to the high rigidity portion of the vehicle-body member, the rigidity of the battery unit and the rigidity of the vehicle-body member are combined so effectively that the torsional rigidity of the vehicle body can be improved as a whole of the vehicle-body member and the battery unit. Further, the battery unit can increase the strength of the vehicle body against a force of the vehicle width direction, thereby improving performance against the vehicle side collision.

Herein, for example, at least part of the side connection portions of the battery unit may be connected to the vehicle-body member at a specified position where a floor cross member extending in the vehicle width direction and integrally connected to a vehicle floor panel of the vehicle floor is located. Or, at least part of the side connection portions of the battery unit may be connected to the vehicle-body member at a specified position where a torque box is located. Or, at least part of the side connection portions of the battery unit may be connected to the vehicle-body member at a specified position where a kick-up portion of a vehicle floor panel is located.

According to an embodiment of the present invention, the support member of the battery unit comprises a pair of longitudinal extension portions which extend in a vehicle longitudinal direction at both-side end portions of the battery unit, at least part of the side connection portions of the battery unit are provided at the longitudinal extension portions, and the side connection portions provided at the longitudinal extension portions are connected to a pair of members which extends in the vehicle longitudinal direction and constitutes the vehicle-body member. Thereby, the rigidity of the battery unit can be improved by the members extending in the vehicle longitudinal direction additionally.

According to another embodiment of the present invention, the pair of members extending in the vehicle longitudinal direction and constituting the vehicle-body member is a pair of front floor frames which is integrally connected to a lower face of the vehicle floor panel. Thereby, a floor tunnel portion can be restrained from deforming in the vehicle side collision as much as possible additionally.

According to another embodiment of the present invention, the battery unit comprises a first mount portion which is provided below a front floor portion of the vehicle floor and a second mount portion which is provided in back of the first mount portion to be continuous from the first mount portion and below a rear floor portion of the vehicle floor, the support member of the battery unit comprises a lateral extension frame which is provided at a connection portion of the first mount portion and the second mount portion and extends in a vehicle width direction, at least part of the side connection portions of the battery unit are connected to both end portions of the lateral extension frame of the support member of the battery unit, and the at least part of the side connection portions of the battery unit are connected to a pair of side sill constituting the vehicle-body member at a specified position where the kick-up portion is located. Herein, a specified portion of the vehicle floor panel which corresponds to the connection portion of the first mount portion and the second mount portion of the battery unit is the kick-up portion having the level which becomes higher from the front floor portion toward the rear floor portion. This kick-up portion is formed by part of the vehicle floor panel which rises stepwise, so that it has generally a relatively high rigidity, like the above-described specified position where the floor cross member is located. Herein, it may be preferable that the strength and rigidity of this kick-up portion be further increased. Accordingly, in this embodiment, the side connection portions of the lateral extension frame member provided at the connection portion of the first mount portion and the second mount portion are connected to the vehicle-body member at the specified position where the kick-up portion is located. Thereby, the kick-up portion can be reinforced by the lateral extension frame member, so that the torsional rigidity of the vehicle body and the performance against the vehicle side collision can be further improved.

According to another embodiment of the present invention, the support member of the battery unit comprises a pair of frame members which extends in a vehicle longitudinal direction at both-side end portions of the battery unit, and each of front end portions of the pair of frame members is connected to a suspension cross member supporting front suspension arms. Thereby, respective connection portions of the frame members and the suspension cross member function as a load pass for a (hitting) obstacle in the vehicle frontal collision, so that a load of the weight of the battery unit can be properly transmitted to the suspension cross member via the above-described connection portions. This suspension cross member is generally positioned right behind a power unit to drive the electromotive vehicle, so it promptly hits against the power unit retreating when the vehicle frontal collision happens. Accordingly, the above-described load transmitted to the suspension cross member is transmitted to the obstacle via the power unit quickly. In other words, the hitting load is immediately transmitted to the battery unit via the power unit and the suspension cross member. Herein, in a case in which the power unit is connected to the suspension cross member, the load of the weight of the battery unit is transmitted to the obstacle more promptly (the hitting load is transmitted to the battery unit more promptly). Accordingly, when the vehicle frontal collision happens, an impact force acts on the battery unit first, then the impact force acts on a vehicle compartment of the vehicle later. As a result, the impact force acting on the vehicle compartment of the vehicle can be decreased, thereby restraining the vehicle compartment from deforming. Thus, restraint of deformation of the vehicle compartment can be properly achieved merely by connecting the front end portions of the fame members and the suspension cross member, so that it may be unnecessary that the vehicle compartment is made excessively strongly. Moreover, the connection of the frame members to the suspension cross member can increase the rigidity of the suspension cross member, thereby improving the torsional rigidity of the vehicle body, too.

According to another embodiment of the present invention, a power unit to drive the electromotive vehicle, the suspension cross member, and the battery unit are arranged in order from a vehicle front to a vehicle rear to overlap each other in a vertical direction. Thereby, the above-described prompt transmission of the load of the weight of the battery unit to the obstacle via the suspension cross member and the power unit in the vehicle frontal collision can be achieved easily.

According to another embodiment of the present invention, the power unit is connected to the suspension cross member. Thereby, the load of the weight of the battery unit can be transmitted to the obstacle via the suspension cross member and the power unit more promptly.

According to another embodiment of the present invention, the battery unit comprises a first mount portion which is provided below a front floor portion of the vehicle floor and a second mount portion which is provided in back of the first mount portion to be continuous from the first mount portion and below a rear floor portion of the vehicle floor, a width, in the vehicle width direction, of the second mount portion is greater than that of the first mount portion, and the pair of frame members is provided at both-side end portions of the first mount portion and extends forwardly from a front end portion of the second mount portion. Thereby, since the second mount portion has the greater width than the first mount portion and its height is generally greater, the second mount may mount many modules and therefore may have its relatively heavy weight. Thus, even if the weight of the second mount portion is relatively heavy, the load of the weight of the second mount portion can be effectively transmitted to the suspension cross member (to the obstacle, eventually) via the above-described frame members extending forwardly from the front end portions of the second mount portion.

Other features, aspects, and advantages of the present invention will become apparent from the following description which refers to the accompanying drawings.

DETAILED DESCRIPTION OF THE INVENTION

Hereafter, a preferred embodiment of the present invention will be descried.

Figure 1:
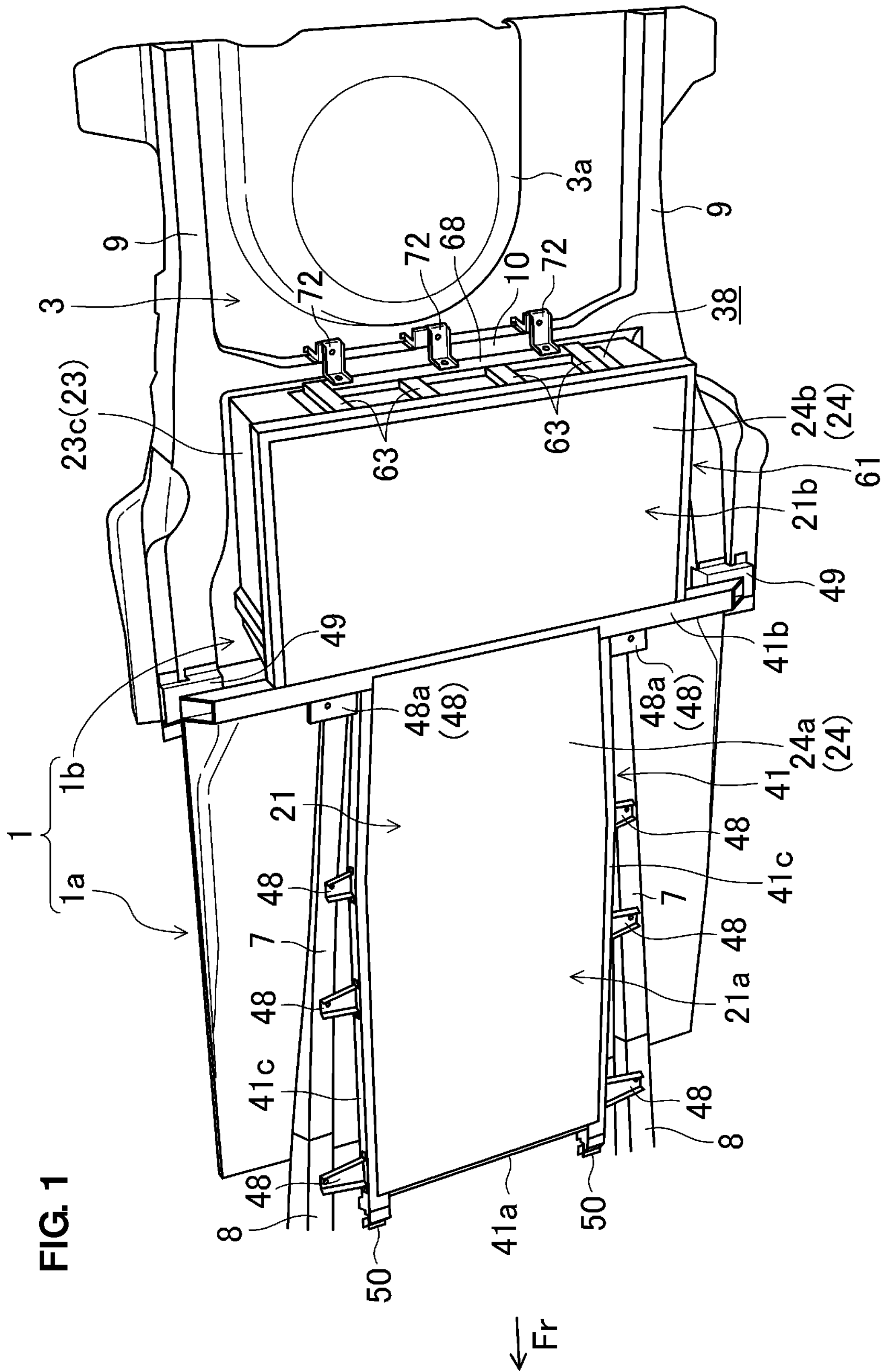
FIG. 1 is a perspective view showing a lower-side structure of a vehicle floor of an electromotive vehicle which is equipped with a battery mounting structure according to an embodiment of the present invention, when viewed from obliquely below.
Figure 2:
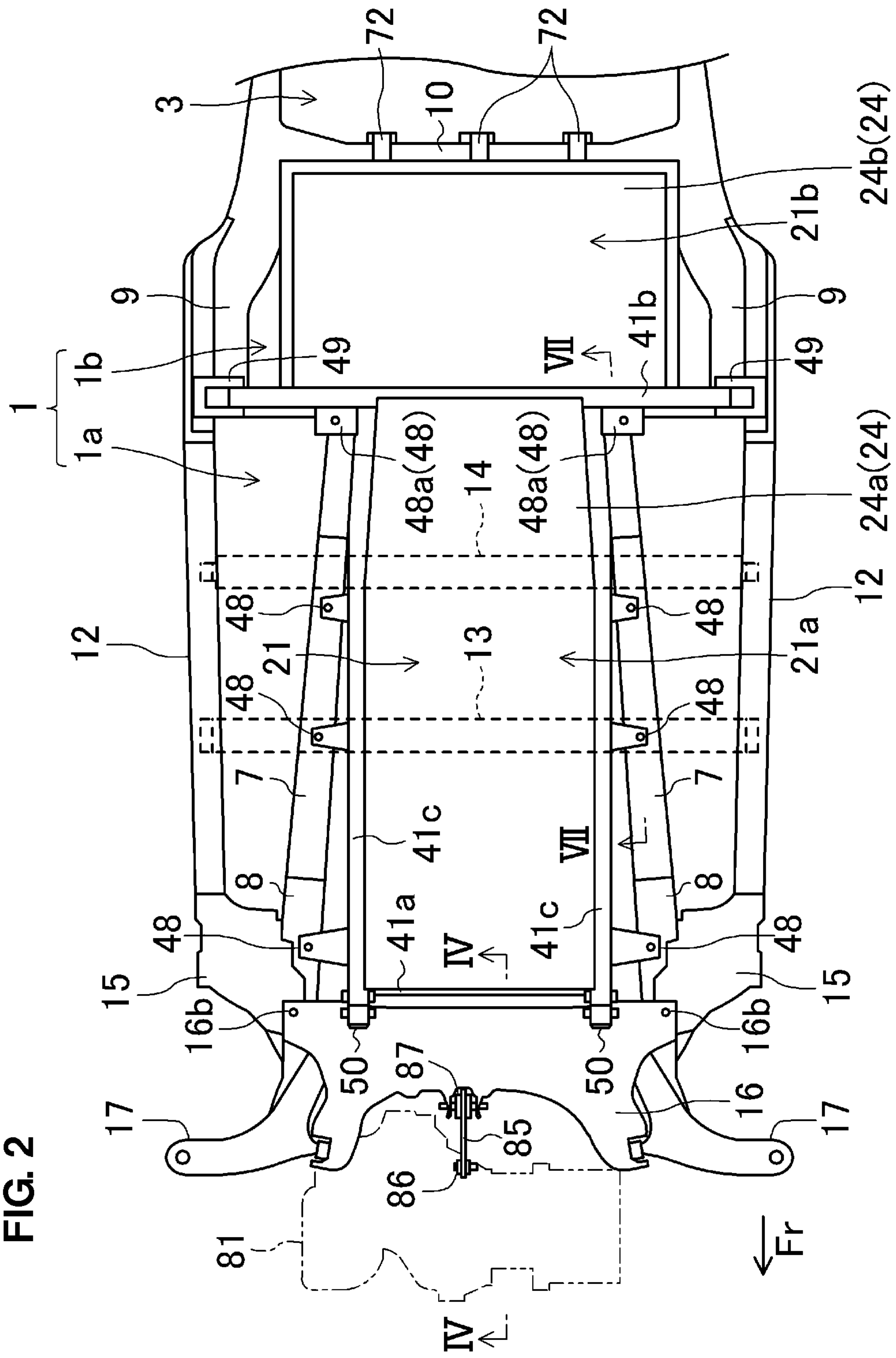
FIG. 2 is a bottom view showing a structure of the vehicle below the vehicle floor panel.
Figure 3:
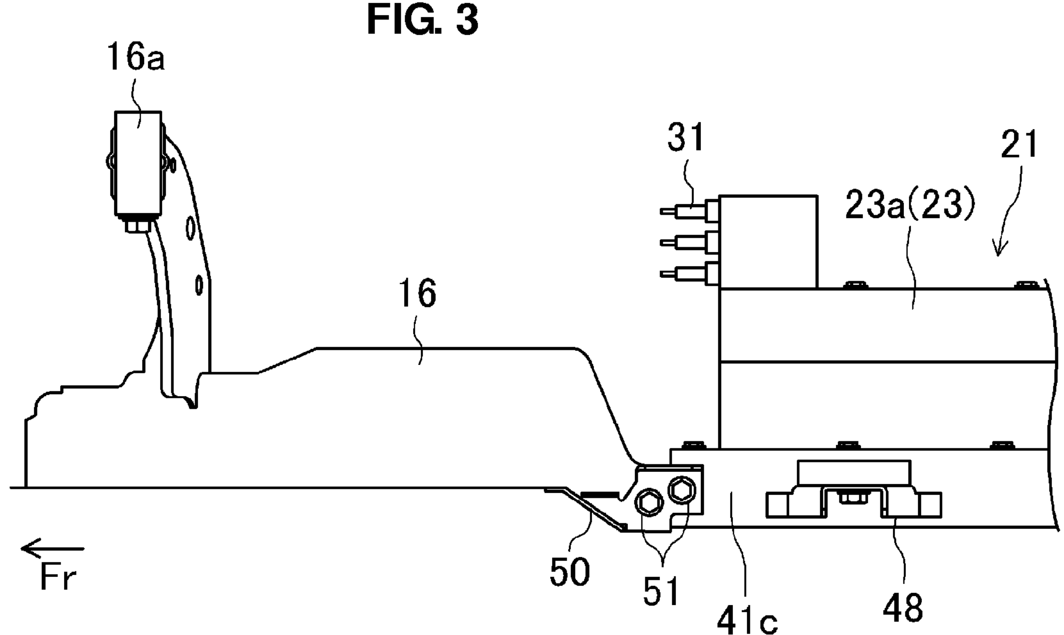
FIG. 3 is a side view of a suspension cross member and a front portion of the battery unit.

FIGS. 1 and 2 show a structure below a vehicle floor panel 1 (constituting a vehicle floor) of an electromotive vehicle (an electric vehicle in the present embodiment) which is equipped with a battery mounting structure according to the present embodiment of the present invention. Herein, the front, rear, left, right, above, or below with respect to a vehicle body will be simply referred to as the “front” “rear” “left” “right” “above” or “below.” In FIGS. 1 through 7, the vehicle front side is shown by an arrow Fr.

The vehicle floor panel 1 comprises a front floor portion **1*a* and a rear floor portion 1*b* which is located above the level of the front floor portion 1*a*. A step-shaped kick-up portion 1*c* (see FIG. 7) is formed between the front floor portion 1*a* and the rear floor portion 1*b*, and the level of the rear floor portion 1*b* is higher than that of the front floor portion 1*a* by the height of this kick-up portion 1*c***.

A rear seat (not illustrated) is arranged on an upper face of the rear floor portion **1*b*. A foot place 1*d* for a passenger seated in the rear seat is formed by an upper face of a rear portion of the front floor portion 1*a*. A driver’s seat and a passenger’s seat (i.e., an assistant’s seat), not illustrated, are arranged side by side on the front portion of the front floor portion 1*a***.

A front end portion of the front floor portion **1*a* is connected to a lower end portion of a dash panel (not illustrated). Both side end portions of the front floor portion 1*a* are connected to a pair side sills 12 (illustrated in FIG. 2** only) which extends in a vehicle longitudinal direction.

A pair of front floor frames 7 which extends in the vehicle longitudinal direction is provided integrally with the vehicle floor panel 1 at a lower face of the front floor portion **1*a* at a specified position which is located slightly inwardly from the side end portion of the front floor portion 1*a* (on the vehicle outside of a floor tunnel portion, not illustrated). Each front floor frame 7 slants slightly inwardly as it extends toward the rear. That is, the distance between the pair of front floor frames 7 becomes narrower toward the rear. Front end portions of the right and left front floor frames 7 are connected to rear end portions of right and left front side frames 8, respectively, in a state in which they are inserted into hollow cross sections of the rear end portions of the front side frames 8**.

Figure 7:
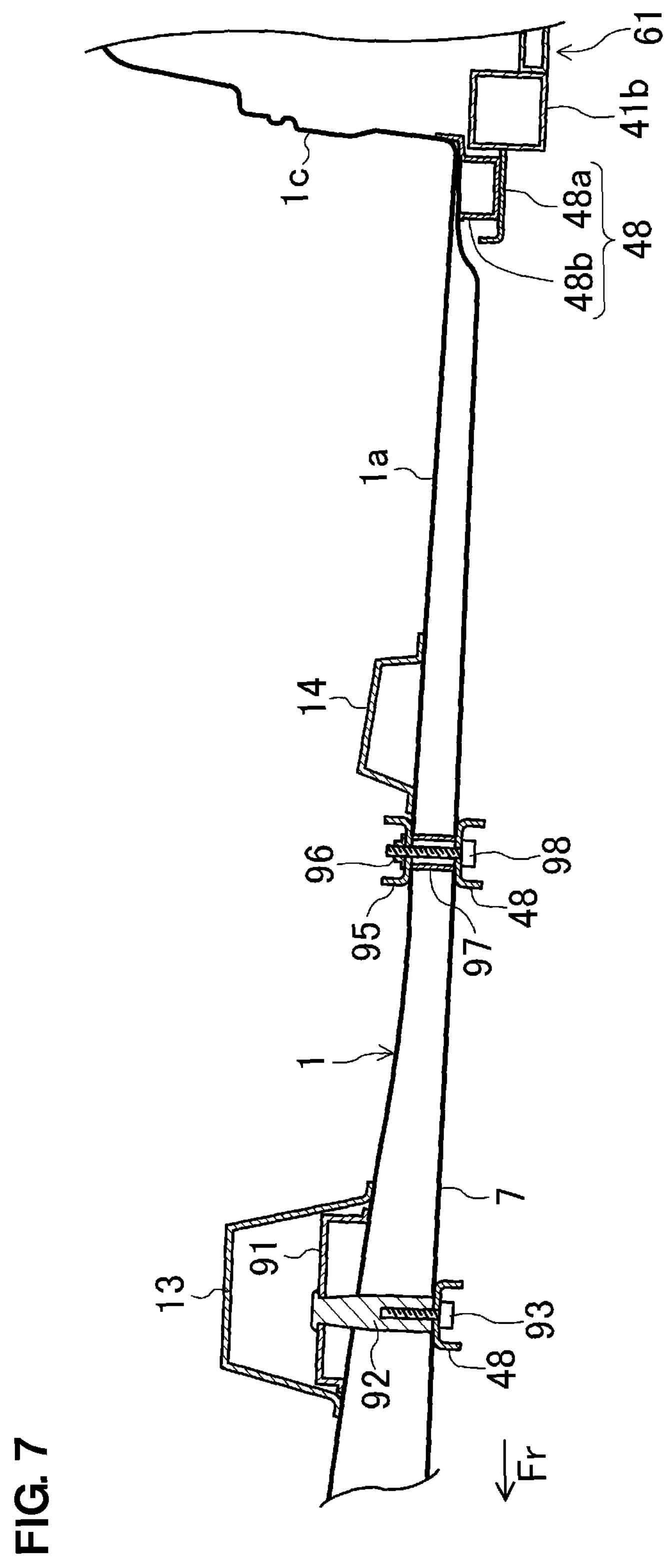
FIG. 7 is a sectional view taken along line VII-VII of FIG. 2.

Front and rear floor cross members 13, 14 which respectively extend in the vehicle width direction are integrally provided at the vehicle floor panel 1 at a middle portion, in the longitudinal direction, of the upper face of the front floor portion **1*a* (see FIGS. 2 and 7). Both end portions of the front floor cross member 13 and both end portions of the rear floor cross member 14 are connected to the both-side side sills 12**, respectively.

The above-described kick-up portion 1*c* is formed by part of the vehicle floor panel 1 which rises stepwise, so that it has generally a relatively high rigidity like the above-described position where the front and rear floor cross members 13, 14 are located. Herein, another floor cross member may be integrally provided at the vehicle floor panel 1 at the kick-up portion 1*c*.

The distance between the front and rear floor cross members 13, 14 is almost the same as that between the front floor cross member 13 and a torque box 15 which will be described below, and that between the rear floor cross member 14 and the kick-up portion 1*c*. That is, the front floor portion 1*a* is configured such that its portions having the high rigidity are arranged at regular intervals in the longitudinal direction, thereby providing the substantially same performance against the vehicle side collision regardless of the longitudinal position where the vehicle side collision occurs.

A pair of torque boxes 15 (illustrated in FIG. 5 only) is provided, respectively, between the rear end portion of the left-side front side frame 8 and the front end portion of the left-side side sill 12, and between the rear end portion of the right-side front side frame 8 and the front end portion of the right-side side sill 12. This torque box 15 can increase the bending rigidity of a kick portion 8*a* (see FIG. 4) where the level of the front side frame 8 changes (gradually lowers toward the rear) to avoid bending of the kick portion 8*a* in a vehicle frontal collision.

A rear end portion of the rear floor portion 1*b* connects to a front end portion of a baggage floor 3. A spare tire pan 3*a* (see FIG. 1) is formed at the baggage floor 3 to project downward. A pair of rear side frames 9 which extends in the vehicle longitudinal direction is provided at respective lower faces of the rear floor portion 1*b* and the baggage floor 3 at their both side end portions. Front end portions of the right and left rear side frames 9 are connected to rear end portions of the right and left side sills 12. At a rear end portion of a lower face of the rear floor portion 1*b* is provided a cross member 10 which interconnects the rear side frames 9 in a vehicle width direction. The distance between the right and left rear side frames 9 is greater than that between the right and left front floor frames 7.

As shown in FIG. 2, a suspension cross member 16 which extends in the vehicle width direction and supports a pair of front suspension arm 17 is provided at a longitudinal position corresponding to the kick portion 8*a* of the front side frame 8 (in front of a battery unit 21 which will be described later). A pair of front connection portions 16*a* which extends upwardly and has its tips connected to a specified position of the front side frames 8 in front of the kick portion 8*a* is provided at both-side end portions of a front portion of the suspension cross member 16 (see FIG. 3). Further, at both-side end portions of a rear portion of the suspension cross member 16 is provided a pair of rear connection portions 16*b* (having through hole for a bolt shaft extending downwardly from a lower face of the torque box 15) which is connected to lower faces of the pair of torque boxes 15.

A power unit 81 to drive the vehicle is provided right in front of the suspension cross member 16. The power unit 81, specific description of which is omitted here, comprises a motor unit including a motor and a transaxle including a drive transmission mechanism (a reduction mechanism and a differential mechanism) to transmit the drive force of the motor to front wheels which are arranged side by side in the vehicle width direction and connected to each other. Respective axes of a motor shaft (drive shaft) of the motor unit, an input shaft of the transaxle (reduction mechanism) which is connected to the motor shaft, and a joint shaft (connected to a front-wheel drive shaft via a uniform-velocity joint) of an output shaft of the power unit 81 (i.e., an output shaft of the transaxle (differential mechanism)) extend in the vehicle width direction. Further, an axis of the power unit 81 as a whole extends in the vehicle width direction as well.

Figure 4:
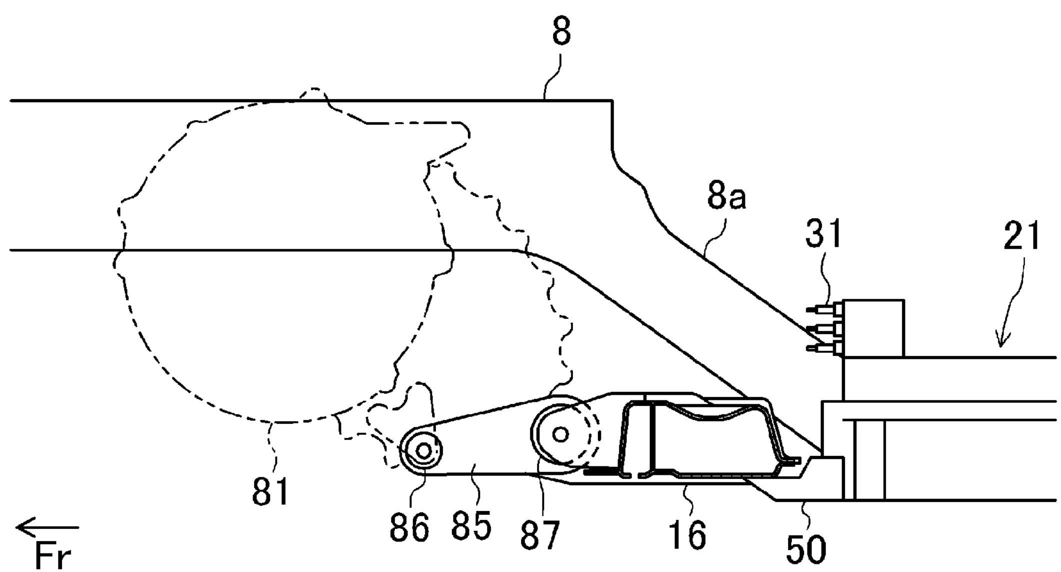
FIG. 4 is a sectional view taken along line IV-IV of FIG. 2.

Both-side end portions of the power unit 81 are resiliently supported at the right and left front side frames 8 via brackets and mount bodies including rubber bushes, not illustrated. As shown in FIGS. 2 and 4, a lower portion of a central portion, in the vehicle width direction, of the power unit 81 is connected to the suspension cross member 16 via a torque rod 85. The above-described resilient support of the both-side end portions of the power unit 81 allows the power unit 81 to rotate (swing) around an axis extending in the vehicle width direction as a whole, but an excessive rotation of the power unit 81 around the axis may be restricted by the above-described torque rod 85. A front end portion of the torque rod 85 is connected to the central portion of the power unit 81 via a rubber bush 86 so as to rotate around an axis extending in the vehicle width direction, while a rear end portion of the torque rod 85 is connected to the central portion of the suspension cross member 16 via a rubber bush 87 so as to rotate around an axis extending in the vehicle width direction.

The power unit 81, the suspension cross member 16, and the battery unit 21 are arranged in order from the vehicle front to the vehicle rear to overlap each other in a vertical direction. That is, the suspension cross member 16 and the battery unit 21 are positioned at the same level, and these members 16, 21 are located at the same level as the lower portion of the power unit 81 (i.e., the level of the torque rod 85).

Figure 5:
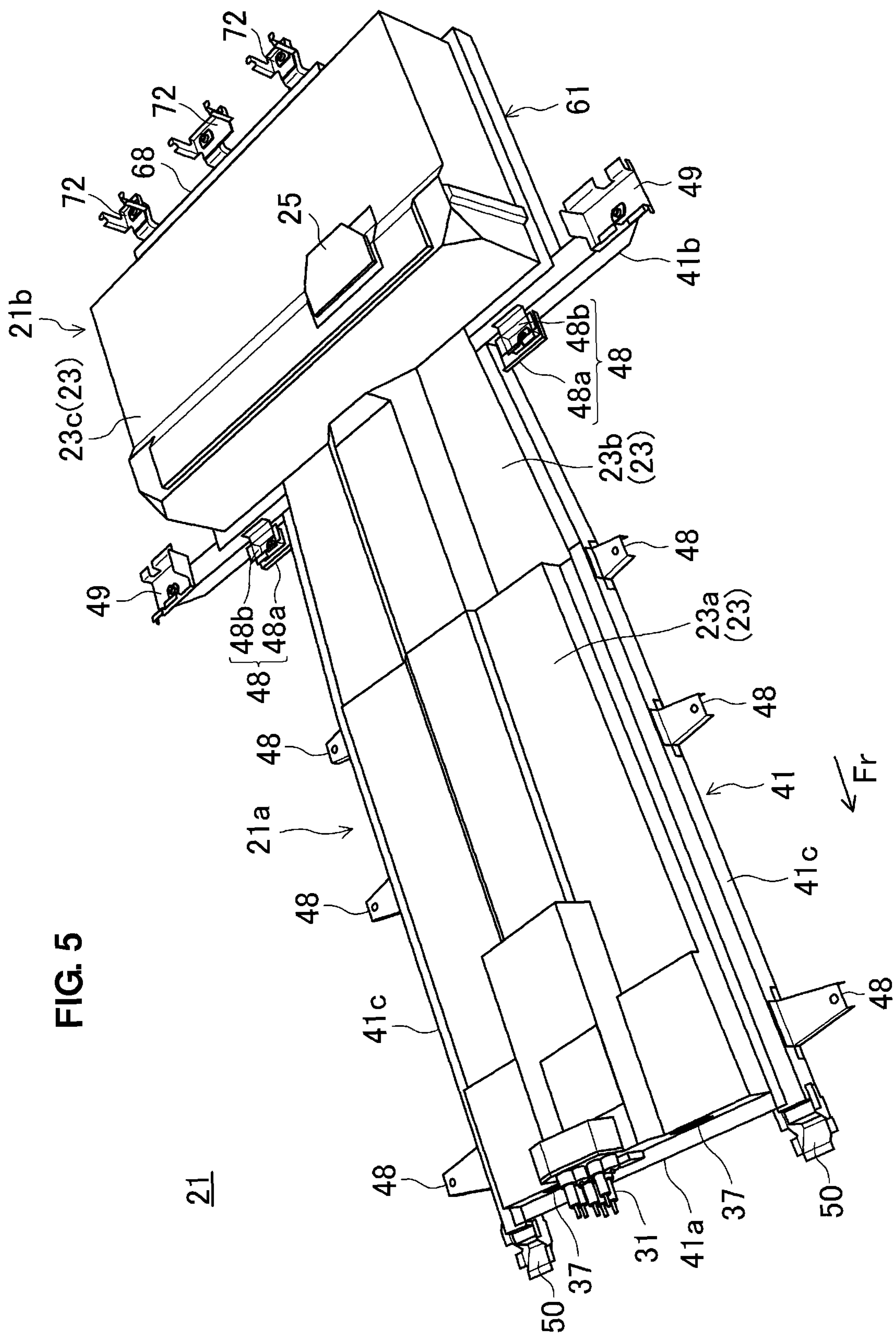
FIG. 5 is a perspective view showing a battery unit.

FIG. 5 shows a battery unit 21 which is mounted below the vehicle floor panel 1. Hereafter, the front, rear, left, right, above, or below with respect to the battery unit 21 means the "front" "rear" "left" "right" "above" or "below" in a state where the battery unit 21 is mounted on the vehicle, which is the same as the above-described "front" "rear" "left" "right" "above" or "lower" with respect to the vehicle body.

The battery unit 21 comprises plural (fourteen, in the present embodiment) battery modules 22 (see FIG. 6), frame members 40, 60 as a support member to support the plural battery modules 22 (see FIG. 6), and an upper cover member 23 and a lower cover member 24. That is, the plural battery modules 22 are mounted below the vehicle floor 1 as a unit. The battery unit 21 comprises a first mount portion 21*a* which is positioned below the front floor portion 1*a* and a second mount portion 21*b* which is continuously positioned behind the first mount portion 21*a* and positioned below the rear floor portion 1*b* as a mount portion to mount the plural battery modules 22.

The above-described upper and lower cover members 23, 24 enclose the plural battery modules 22. That is, a space for storing the battery modules 22 and the frame members 40, 60 is formed between the upper and lower cover members 23, 24. Herein, part of the frame members 40, 60 projects outside through a space between the peripheral portion of the upper cover member 23 and the peripheral portion of the lower cover member 24, so that part of the outside face of the frame members 40, 60 is exposed to the outside air.

Further, the battery unit 21 comprises an air inlet port 37 (see FIG. 5) to take in the air (outside air) inside the battery unit 21 (into a space storing the battery module 22), an air outlet port 38 (see FIG. 1) to exhaust the taken-in air, and a fan (not illustrated) to conduct the air's taking in or exhaustion. The air inlet port 37 and the air outlet port 38 are formed at a front end portion and a rear end portion of the upper cover member 23, respectively, and the fan is provided near the air outlet port 38. The air (outside air) is taken in from the air inlet port 37 by the operation of the fan, and this air flows down rearward through the space between the battery modules 22 and the upper and lower cover members 23, 24 inside the battery unit 21, then gets out of the air inlet port 38. Thereby, the inside of the battery unit 21 (the battery modules 22) is cooled.

The upper cover member 23 comprises a first portion 23*a*, a second portion 23*b*, and a third portion 23*c*, from the front. The first portion 23*a* and the second portion 23*b* are positioned at the first mount portion 21*a*, and the third portion 23*c* is positioned at the second mount portion 21*b*. The first portion 23*a* is located above the four battery modules 22 on the first mount portion 21*a*, and the second portion 23*b* is located above an electric-component installment portion 27 which will be described below. The upper face of the third portion 23*c* is positioned above the level of the upper faces of the first portion 23*a* and the second portion 23*b* corresponding to the height position of the front floor portion 1*a* and the rear floor portion 1*b*. Further, the lower cover member 24 comprises a first portion 24*a* and a second portion 24*b*, and the first portion 24*a* is located at the first mount portion 21*a* and the second portion 24*b* is located at the second mount portion 21*b*. The lower faces of the first portion 24*a* and the second portion 24*b* of the lower cover member 24 are located at the same level.

A cover 25 is provided at the upper face of the third portion 23*c* of the upper cover member 23. The cover 25 covers a plug hole (not illustrated) which is provided at the upper face of the third portion 23*c* to plug a safety plug, not illustrated, into a plug receiver 35 (see FIG. 6). This safety plug is provided to shut down part of a high voltage circuit from the safety stand point when the battery unit 21 is manufactured. The part of this circuit which has been shut down is connected by plugging the safety plug into the plug receiver 35. Before the battery unit 21 is installed, the cover 25 is not attached and the plug hole is open. Then, after the battery unit 21 is mounted below the vehicle floor 1, the safety plug is plugged into the plug receiver 35 from the vehicle inside. That is, a service hole is formed at the rear floor portion 1*b* below the rear seat, the safety plug is plugged into the plug receiver 35 via the service hole and the plug hole, and then the plug hole is covered with the cover 25.

At the front end portion of the battery unit 21 is arranged an inverter-connection terminal 31 which electrically couples the battery unit 21 to an inverter, not illustrated, which is provided above the power unit 81. An electric power is supplied to the motor of the motor unit at the power unit 81 from the battery unit 21 via the inverter. The inverter-connection terminal 31 is supported at an inverter-connection terminal support portion 44 which is provided at a front portion 41*a* of a frame portion 41 of the frame member 40 as described below (see FIG. 6).

Figure 6:
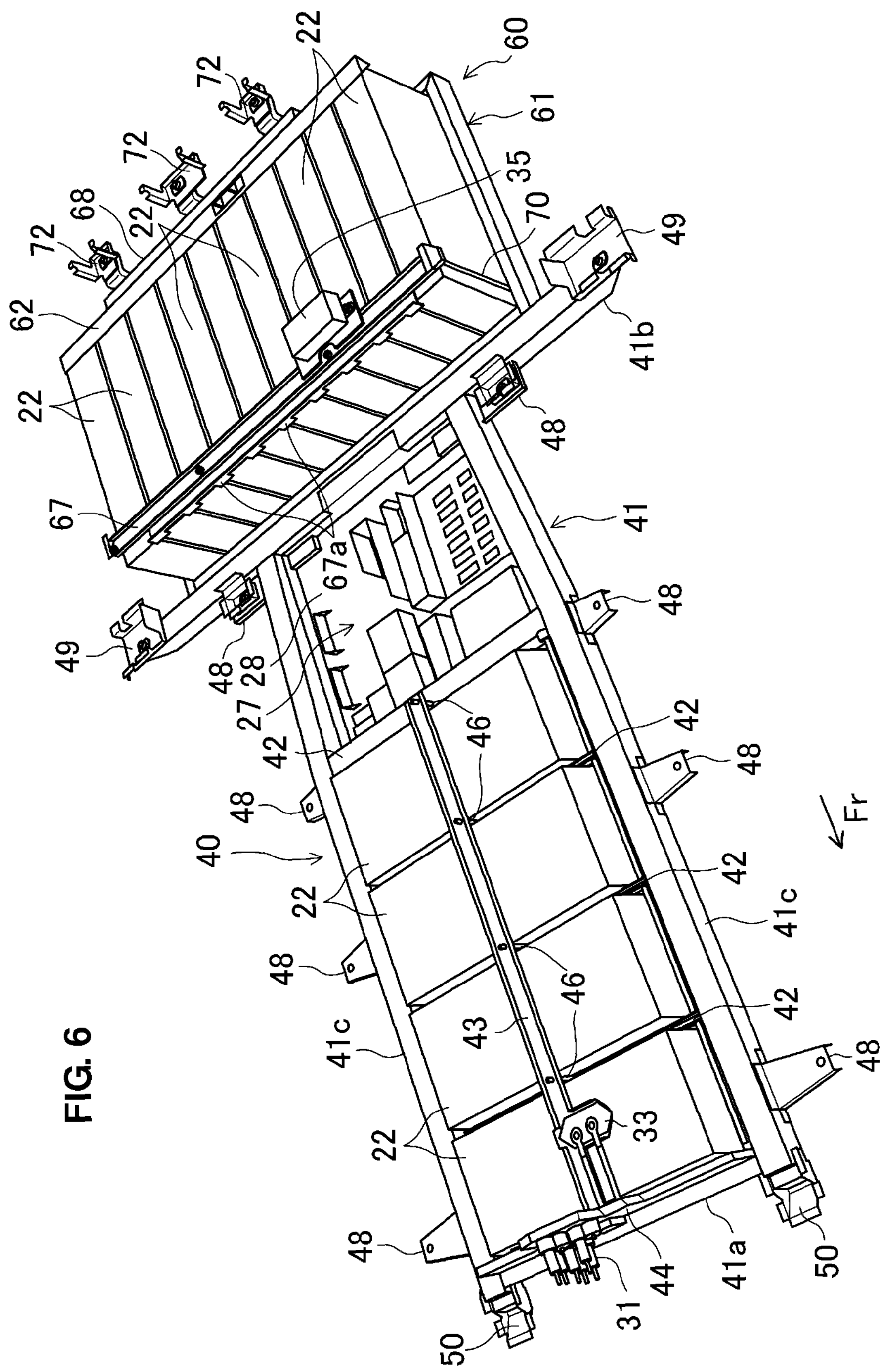
FIG. 6 is a perspective view showing a state in which upper and lower cover members of the battery unit are removed.

As shown in FIG. 6, each of the plural battery modules 22 of the battery unit 21 has substantially the same flat shape having a rectangular section along its longitudinal direction. That is, the battery module 22 is substantially of a rectangular parallelepiped shape. The battery module 22 stores plural (hundreds) cylindrical cells in it. With respect to the battery module 22, the direction in which the long side of the above-described rectangular section extends will be referred to as the width direction, and the direction in which the short side of the rectangular section extends will be referred to as the thickness direction.

The battery modules 22 mounted on the first mount portion 21*a* (the four battery modules in the present embodiment) are arranged in the vehicle longitudinal direction such that the longitudinal direction of each of the battery modules 22 matches the vehicle width direction and the short side of the rectangular section of each of the battery modules 22 extends in the vehicle vertical direction (such that the thickness direction of each of the battery modules 22 matches the vehicle vertical direction and the width direction of each of the battery modules 22 matches the vehicle longitudinal direction). Meanwhile, the battery modules 22 mounted on the second mount portion 21*b* (the ten battery modules in the present embodiment) are arranged in the vehicle width direction such that the longitudinal direction of each of the battery modules 22 matches the vehicle longitudinal direction and the short side of the rectangular section of each of the battery modules 22 extends in the vehicle longitudinal direction (such that the width direction of each of the battery modules 22 matches the vehicle vertical direction and the thickness direction of each of the battery modules 22 matches the vehicle width direction).

The first mount portion 21*a* has an electric-component installment portion 27 to install electric components (not illustrated) relating to a battery charge-discharge control, such as IC, resister or relay. This electric-component installment portion 27 of the first mount portion 21*a* of the battery unit 21 is located below a rear portion (the foot place 1*d* of the passenger seated in the rear seat) of the front floor portion 1*a*. The above-described four battery modules 22 are arranged on the first mount portion at a specified position below the front portion of the front floor portion 1*a* (in front of the electric-component installment portion 27).

The electric-component installment portion 27 includes a tray 28 which forms its upper face having a shape corresponding to the shape of the electric component. The electric components are installed on the tray 28. The maximum height of the electric components installed on the tray 28 of the electric-component installment portion 27 of the first mount portion 21*a* of the battery unit 21 is located below the upper face of the battery modules 22 mounted on the first mount portion 21*a*.

The first mount portion 21*a* comprises the frame member 40 to support the plural battery modules 22 at this mount portion 21*a* and the tray 28 of the electric-component installment portion 27, and the second mount portion 21*b* comprises the frame member 60 to support the plural battery modules 22 at this mount portion 21*b*.

The frame member 40 of the first support portion 21*a* has a frame portion 41 with a front portion 41*a*, a rear portion 41*b*, and a pair of side portions 41*c*. The front portion 41*a* of the frame portion 41 extends in the vehicle width direction and its both end portions are connected to respective front end portions of the side portions 41*c* extending longitudinally. The rear portion 41*b* of the frame portion 41 extends outward beyond the side portions 41*c*, and the side portions 41*c* connect to a middle portion of the rear portion 41*b*. That is, the side portions 41*c* are provided at the both end portions of the first mount portion 21*a*, and extend forwardly from the second mount portion 21*b*. At the front portion 41*a* of the frame portion 41 is provided the inverter-connection terminal support portion 44 to support the inverter-connection terminal 31. The rear portion 41*b* and the side portions 41*c* of the frame portion 41 are formed, respectively, in a hollow shape having the rectangular section.

Further, the frame member 40 further has four middle frame portions 42 which interconnect the both side portions 41*c* at four middle positions of the both side portions 41*c* of the frame portion 41. The four middle frame portions 42 and the front portion 41*a* of he frame portion 41 support lower portions of the outside end portions of the four battery modules 22 on the first mount portion 21*a*. The rearmost middle frame portion 42 supports the rearmost battery module 22 and the above-described tray 28 together with the rear portion 41*b* of the frame portion 41. That is, the tray 28 is supported at tray support portions 45 which are respectively provided at the rearmost middle frame portion 42 and the rear portion 41*b*. The other three middle frame portions 42 are located between the adjacent battery modules 22, and support lower portions of the outside end portions of the respective battery modules 22 and also specify setting positions of the respective battery modules 22.

The frame member 40 further includes an upper frame portion 43 which extends longitudinally at the center between the both side portions 41*c* of the frame portion 41 and supports an upper portion of the battery modules 22 on the first mount portion 21*a*. The upper frame portion 43 is supported at the middle frame portion 42 via poles 46, and its front end is supported at the above-described inverter-connection terminal support portion 44. A connection terminal 33 to which harnesses from the inverter-connection terminal 31 are coupled is supported at a frontal position of the upper frame portion 43

Four fixing portions 48 to be fixed to the right and left front floor frames 7 are provided at outside faces of the side portions 41*c* of the frame portion 41. As shown in FIGS. 1 and 2, a pair of the foremost two fixing portions 48 is fixed to connection portions between the front floor frames 7 and the front side frames 8 (overlap portions of the front floor frames 7 and the front side frames 8 which are positioned in the vicinity of the torque boxes 15). That is, each of the foremost fixing portions 48 is connected to the front floor frame 7 at a specified position where the torque box 15 is located.

A pair of the second fixing portions 48 from the front is, as shown in FIGS. 2 and 7, connected to the front floor flames 7 which are positioned in the vicinity of the front floor cross member 13 (right below the front floor cross member 13). Specifically, a pair of shaft portions 92 extends downwardly and is fixed to a plate member 91 which is connected to the vehicle floor panel 1, and each lower end of the shaft portions 92 contacts an inside face of the front floor frame 7. A pair of bolts 93 which penetrates each of the second fixing portions 48 is screwed into the shaft portions 92. Accordingly, each of the second fixing portions 48 is connected to the front floor frame 7 at a specified position where the front floor cross member 13 is located.

A pair of the third fixing portions 48 from the front is, as shown in FIGS. 2 and 7, connected to the front floor flames 7 which are positioned in the vicinity of the rear floor cross member 14. Specifically, a pair of plate members 95 is fixed to the vehicle floor panel 1 at a specified position right in front of the rear floor cross member 14. A pair of nut members 96 is fixed to each upper face of the plate members 95, and a pair of sleeves 97 is fixed to each lower face of the plate members 95 and extends downwardly. Each lower end of the sleeves 97 contacts the inside face of the front floor frame 7. A pair of bolts 98 which penetrates each of the third fixing portions 48 is screwed into the nut members 96 through the sleeves 97. Accordingly, each of the third fixing portions 48 is connected to the front floor frame 7 at a specified position where the rear floor cross member 14 is located.

Each of a pair of the rearmost fixing portions 48 comprises a base portion 48*a* and a height adjustment portion 48*b* provided above the base portion 48*a*. The base portion 48*a* is connected to the rear portion 41*b* of the frame portion 41 in addition to the side portion 41*c* of the frame portion 41. The rearmost fixing portions 48 are fixed to rear end portions (located at a higher level than the other) of the front floor frames 7 in a state in which each upper end of the height adjustment portions 48*b* contacts the front floor frame 7. Herein, each of the rear end portions of the front floor frames 7 is located in the vicinity of the above-described kick-up portion 1*c*. Accordingly, each of the rearmost fixing portions 48 is connected to the front floor frame 7 at a specified position where the kick-up portion 1*c* is located.

A pair of fixing members 50 is fixed to front end portions of the both side potions 41*c* of the frame portion 41 by bolts 51 (see FIG. 3) and projects forwardly. The fixing members 50 are fixed to the suspension cross member 16 by welding. Thus, the front end portions of the both side portions 41*c* are connected to the suspension cross member 16.

At both end portions of the rear portion 41*b* of the frame portion 41 is provided a pair of fixing portions 49 which is respectively fixed to a connection portion of the left-side rear side frame 9 and the left-side side sill 12 and a connection portion of the right-side rear side frame 9 and the right-side side sill 12. The rear portion 41*b* of the frame portion 41 is positioned below the kick-up portion 1*c* at a connection portion of the first mount portion 21*a* and the second mount portion 21*b*. Thus, each of the fixing portions 49 provided at the both end portions of the rear portion 41*b* is connected to the side sill 12 at a specified position where the kick-up portion 1*c* is located.

The frame member 60 of the second mount portion 21*b* has a lower frame member 61 which includes a front portion which extends in the vehicle width direction and supports lower portions of front end portions of the plural battery modules 22, a rear portion which extends in the vehicle width direction and supports lower portions of rear end portions of the plural battery modules 22, and a pair of side portions which interconnects both side end portions of the front and rear portions and supports lower portions of outside end portions of the two battery modules 22 located on both side ends in the vehicle width direction. A front portion of the lower frame portion 61 is integrally connected to the rear portion 41*b* of the frame portion 41. The distance between the both side portions of the lower frame portion 61 is greater than that between the both side portions 41*c* of the frame portion 41 at the first mount portion 21*a* of the frame member 40. That is, the width, in the vehicle width direction, of the second mount portion 21*b* is greater than that of the first mount portion 21*a*.

The frame member 60 of the second mount portion 21*b* further comprises a rear upper frame portion 62 (see FIG. 6) which supports upper portions of rear end portions of the plural battery modules 22, plural (four) connection frame portions 63 (see FIG. 1) which connect the rear upper frame portion 62 and the rear portion of the lower frame portion 61, plural middle frame portions (not illustrated) which interconnect the front portion and the rear portion of the lower frame portion 61, a central frame portion (not illustrated) which interconnects respective central portions, in the vehicle longitudinal direction, of the both side portions of the lower frame portion 61, and a front upper frame portion 67 which supports upper portions of front end portions of the plural battery modules 22.

The middle frame portions (nine in total) are located between the adjacent battery modules 22 and support respective lower portions of thick-direction end portions of the battery modules 22, and also specify setting positions of the respective battery modules 22. Respective central portions of the middle frame portions are supported at the central portion.

The above-described front upper frame portion 67 is supported at the lower frame portion 61 via some poles 70 to extend in the vehicle width direction. At a front end of the front upper frame portion 67 are formed nine engagement portions 67*a* which engage with upper portions of front end faces of the battery modules 22 on the second mount portion 21*b*. Each of the engagement portions 67*a* engages with the upper portions of the front end faces of the two adjacent battery modules 22. Further, at the front upper portion 67 is provided a plug receiver 35 into which the above-described safety plug is plugged.

The above-described rear upper frame portion 62 has a reverse-L shaped section and triangular both end faces. At a rear face of the rear upper frame portion 62 is provided a reinforcement frame portion 68 which extends in the vehicle width direction over between the leftmost connection frame portion 63 and the rightmost connection frame portion 63. This reinforcement frame portion 68 can be considered as part of the rear upper frame portion 62. The upper end portions of the connection frame portions 63 are connected to the reinforcement portion 68. The upper end portions of the leftmost connection frame portion 63 and the rightmost connection frame portion 63 are respectively connected to the both outside end portions of the reinforcement frame portion 68 and specified portions of the rear face of the rear upper frame portion 62 where the reinforcement portion 68 does not exist. The second and third connection frame portions 63 are connected to the lower face of the reinforcement frame portion 68.

The reinforcement frame portion 68 projects outside the battery unit 21 through the air outlet port 38 formed at the rear end portion of the upper cover member 23. At the rear face of the reinforcement frame portion 68 are provided three fixing portions 72 to be fixed to the above-described cross member 10.

In the present embodiment, the fixing portions 48, 49 correspond to side connection portions provided at the both-side end portions of the battery unit 21. The both side portions 41*c* of the frame portion 41 correspond to a pair of longitudinal extension portions which extends in the vehicle longitudinal direction at the both-side end portions of the battery unit 21, and the fixing portions 48, which correspond to the connection portions provided at the pair of longitudinal extension portions, are connected to the vehicle-body member (the front floor frame 7) extending longitudinal direction. Further, the rear portion 41*b* of the frame portion 41 corresponds to a lateral frame member which is provided at the connection portion of the first mount portion 21*a* and the second mount portion 21*b* and extends in the vehicle width direction, and the fixing portions 49, which correspond to the connection portions provided at the lateral frame member, are connected to the side sills 12.

Thus, according to the present embodiment, the four fixing portions 48 provided at the side portions 41*c* of the frame portion 41 are connected to the front floor frames 7 as the vehicle-body member at the specified positions where the floor cross members (the front and rear floor cross members 13, 14) are located, at the specified positions where the torque boxes 15 are located, and at the specified positions where the kick-up portion 1*c* is located. Further, the fixing portions 49 provided at the end portions of the rear portion 41*b* are connected to the side sills 12 as the vehicle-body member at the specified positions where the kick-up portion 1*c* is located. That is, since the fixing portions 48, 49 are connected to the high rigidity portions of the vehicle-body member, the rigidity of the battery unit 21 and the rigidity of the vehicle-body member are combined so effectively that the torsional rigidity of the vehicle body can be improved as a whole of the vehicle-body member and the battery unit 21. Further, the battery unit 21 can increase the strength of the vehicle body against a force of the vehicle width direction, thereby improving the performance against the vehicle side collision.

Further, since the fixing members 50 provided at the front end portions of the side portions 41*c* are connected to the suspension cross member 16 at the front side of the battery unit 21 and the fixing portions 72 provided at the reinforcement frame portion 68 at the rear face of the rear upper frame portion 62 are connected to the rear cross member 10 at the rear side of the battery unit 21, the rigidity of the suspension cross member 16 and the rear cross member 10 are increased so that the torsional rigidity of the vehicle body can be further improved.

In the present embodiment, the both side portions 41*c* of the frame portion 41 constitute a pair of frame members which extends in the vehicle longitudinal direction at the both-side end portions of the battery unit 21, and the pair of frame members is provided at the both-side end portions of the first mount portion 21*a* and extends forwardly from the front end portion of the second mount portion 21*b*. And, each of the front end portions of the both side portions 41*c* is connected to the suspension cross member 16. Thereby, the respective connection portions of the side portions 41*c* and the suspension cross member 16 function as a load pass against the hitting obstacle in the vehicle frontal collision, so that the load of the weight of the battery unit 21 can be properly transmitted to the suspension cross member 16 via the above-described connection portions. This suspension cross member 16 is positioned right behind the power unit 81 and connected via the power unit 81 and the torque rods 85, so it promptly hits against the power unit 81 retreating when the vehicle frontal collision happens. Accordingly, the load transmitted to the suspension cross member 16 is transmitted to the obstacle via the power unit 81 quickly. In other words, the hitting load is immediately transmitted to the battery unit 21 via the power unit 81 and the suspension cross member 16. Accordingly, when the vehicle frontal collision happens, the impact force acts on the battery unit 21 first. Then the impact force acts on the vehicle compartment later. As a result, the impact force acting on the vehicle compartment can be decreased, thereby restraining the vehicle compartment from deforming. Thus, restraint of deformation of the vehicle compartment can be properly achieved with a simple structure.

Herein, the second mount portion 21*b* of the battery unit 21 of the present embodiment mount more battery modules 22 than the first mount portion 21*a* does, therefore the weight of the second mount portion 21*b* is relatively heavy. However, since the side portions 41*c* of the frame portion 41 are provided at the both-side end portions of the first mount portion 21*a* and extend forwardly from the front end portion of the second mount portion 21*b*, the load of the weight of the second mount portion 21*b* can be effectively transmitted to the suspension cross member 16 (to the obstacle, eventually) via the side portions 41*c*.

The present invention should not be limited to the above-described embodiment, and any other modifications and improvements may be applied within the scope of a sprit of the present invention.

For example, the vehicle-body member to which the fixing portion 48 is connected may be the vehicle floor panel 1 or the side sill 12 like the case of the fixing portion 49 instead of the front floor frame 7. Further, this fixing portion 48 may be connected to the vehicle-body member at a specified position where the floor cross member is located or at a specified position where the torque box 15 is located. Moreover, in a case in which any side connection portion is provided at the second mount portion 21*b*, this side connection portion may be connected to the rear side frame 9 at a specified position where the kick-up portion 1*c* is located, or to the rear side frame 9 at a specified position where the rear cross member 10

(floor cross member) is located. In this case, the side portions 41*c* may be provided to extend from the first mount portion 21*a* to the second mount portion 21*b*, and at specified portions of the side portions 41*c* which correspond to the second mount portion 21*b* may be provided side connection portions which are connected to the rear side frames 9 in the vicinity of the kick-up portion 1*c* or the rear cross member 10 at the rear side frame 9.

Further, while the power unit 81 and the suspension cross member 16 are connected via the torque rod 85 in the present embodiment, it may be unnecessary that they are connected. Even in this case, as long as the power unit 81 is positioned right in front of the suspension cross member 16, the power unit 81 retreats and hits against the suspension cross member 16 promptly in the vehicle frontal collision. Thereby, the load transmitted to the suspension cross member 16 from the battery unit 21 is promptly transmitted to the obstacle (the impact load is quickly transmitted to the battery unit 21) via the power unit 81.

What is claimed is:

1. A battery mounting structure of an electromotive vehicle having a front end, a rear end, a left side and a right side as viewed from the rear end toward the front end of the vehicle, comprising:

a floor panel constituting a vehicle floor;

a pair of side sills provided at both left and right side portions of the floor panel and extending in a vehicle longitudinal direction;

at least one floor cross member having a substantially inverse U-shaped cross section and extending in a vehicle width direction, the at least one floor cross member being jointly provided at an upper face of the floor panel and connected to the pair of side sills at both end portions thereof;

a pair of front floor frames extending in the vehicle longitudinal direction, the front floor frames being integrally connected to a lower face of the floor panel, wherein the floor panel, the pair of side sills, and the at least one floor cross member constitute a vehicle-body structure; and a battery unit mounted on the vehicle-body structure, the battery unit comprising a battery module, a support member to support the battery module, and plural pairs of side connection portions for mounting the battery unit on the vehicle-body structure which are provided at left and right side portions of the support member, in the vehicle width direction, wherein at least one pair of said plural pairs of side connection portions of the battery unit are connected to respective lower faces of said pair of front floor frames by a fixing member which penetrates the side connection portion of the battery unit, the front floor frame, and the floor panel at a specified position which is located right below said floor cross member or in the vicinity of the floor cross member, respectively.

2. A battery mounting structure of an electromotive vehicle having a front end, a rear end, a left side and a right side as viewed from the rear end toward the front end of the vehicle, comprising:

a floor panel constituting a vehicle floor;

a pair of side sills provided at both left and right side portions of the floor panel and extending in a vehicle longitudinal direction;

a pair of front floor frames extending in the vehicle longitudinal direction, the front floor frames being integrally connected to a lower face of the floor panel;

a pair of front side frames extending forward continuously from front end portions of the pair of front floor frames;

a pair of torque boxes being provided to interconnect rear end portions of the pair of front side frames and front end portions of the pair of side sills, respectively, wherein the floor panel, the pair of side sills, the pair of front floor frames, and the pair of front side frames constitute a vehicle-body structure; and a battery unit mounted on the vehicle-body structure, the battery unit comprising a battery module, a support member to support the battery module, and plural pairs of side connection portions for mounting the battery unit on the vehicle-body structure which are provided at left and right side portions of the support member, in a vehicle width direction, wherein at least one pair of said plural pairs of side connection portions of the battery unit are connected to respective lower faces of said pair of front side frames at a specified position which is located in the vicinity of said torque box.

3. A battery mounting structure of an electromotive vehicle having a front end, a rear end, a left side and a right side as viewed from the rear end toward the front end of the vehicle, comprising:

a floor panel constituting a vehicle floor;

a pair of front floor frames extending in a vehicle longitudinal direction, the front floor frames being integrally connected to a lower face of the floor panel, wherein the floor panel and the pair of front floor frames constitute a vehicle-body structure;

a battery unit mounted on the vehicle-body structure, the battery unit comprising a battery module, a support member to support the battery module, and plural pairs of side connection portions for mounting the battery unit on the vehicle-body structure which are provided at left and right side portions of the support member, wherein said support member of the battery unit comprises a pair of longitudinal extension frame members which extend in the vehicle longitudinal direction at left and right side portions of said battery unit, in the vehicle width direction, at least one pair of said plural pairs of side connection portions of the battery unit are provided at outside faces of said pair of longitudinal extension frame members of the support member of the battery unit, and said at least one pair of the side connection portions provided at the pair of longitudinal extension frame members are connected to respective lower faces of said pair of front floor frames, wherein each of front end portions of said pair of longitudinal extension frame members of the support member of the battery unit is connected to a suspension cross member supporting front suspension arms.

4. The battery mounting structure of an electromotive vehicle of claim 3, wherein a power unit to drive the electromotive vehicle, said suspension cross member, and said battery unit are arranged in order from a vehicle front to a vehicle rear to overlap each other in a vertical direction.

5. The battery mounting structure of an electromotive vehicle of claim 4, wherein said power unit is connected to said suspension cross member.

6. The battery mounting structure of an electromotive vehicle of claim 3, further comprising a pair side sills provided at both left and right side portions of the floor panel and extending in a vehicle longitudinal direction, wherein said battery unit comprises a first part which is provided below a front floor portion of the vehicle floor and a second part which is provided in back of said first part to be continuous from the first part and below a rear floor portion of the vehicle floor, said support member of the battery unit further comprises a lateral extension frame member which is provided at a connection portion of said first part and said second part and extends in the vehicle width direction, projecting outward, in the vehicle width direction, beyond said pair of longitudinal extension frame members, at least another pair of said plural pairs of side connection portions of the battery unit are provided at both end portions of said lateral extension frame member of the support member of the battery unit, and said at least another pair of the side connection portions provided at the both end portions of the lateral extension frame member are connected to said pair of side sills at a specified position which is located in the vicinity of a kick-up portion of said floor panel.

7. The battery mounting structure of an electromotive vehicle of claim 3, wherein said battery unit comprises a first part which is provided below a front floor portion of the vehicle floor and a second part which is provided in back of said first part to be continuous from the first part and below a rear floor portion of the vehicle floor, a width, in the vehicle width direction, of said second part is greater than that of said first part, and said pair of longitudinal extension frame members of the support member of the battery unit is provided at left and right side portions, in the vehicle width direction, of the first part and extends forwardly from a front end portion of the second part.

8. The battery mounting structure of an electromotive vehicle of claim 3, wherein said pair of front floor frames are configured such that a lateral distance, in the vehicle width direction, of the front floor frames decreases gradually toward a vehicle rear direction.

* * * * *